US011858817B2

(12) United States Patent
Pate et al.

(10) Patent No.: US 11,858,817 B2
(45) Date of Patent: Jan. 2, 2024

(54) NANODIAMOND REDUCTION PHOTOCHEMISTRY

(71) Applicant: The Government of the United States of America, as represented by the Secretary of the Navy, Arlington, VA (US)

(72) Inventors: Bradford B. Pate, Arlington, VA (US); William Maza, Camp Spring, MD (US); Vanessa Breslin, Alexandria, VA (US); Paul A. DeSario, Alexandria, VA (US); Tatyana I. Feygelson, Springfield, VA (US); Albert Epshteyn, Potomac, MD (US); Jeffrey C. Owrutsky, Silver Spring, MD (US); Carlos Hangarter, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 348 days.

(21) Appl. No.: 17/104,676

(22) Filed: Nov. 25, 2020

(65) Prior Publication Data

US 2021/0163298 A1 Jun. 3, 2021

Related U.S. Application Data

(60) Provisional application No. 62/940,611, filed on Nov. 26, 2019.

(51) Int. Cl.
*C01B 32/28* (2017.01)
*B01J 19/12* (2006.01)
*B82Y 40/00* (2011.01)
*B82Y 30/00* (2011.01)

(52) U.S. Cl.
CPC ............ *C01B 32/28* (2017.08); *B01J 19/123* (2013.01); *B01J 2219/089* (2013.01); *B01J 2219/1203* (2013.01); *B82Y 30/00* (2013.01); *B82Y 40/00* (2013.01); *C01P 2004/64* (2013.01)

(58) Field of Classification Search
CPC ..... C01B 32/28; C01B 21/1409; C01B 32/40; B01J 19/123; B01J 2219/089; B01J 2219/1203; B01J 35/004; B01J 19/127; B01J 37/18; B01J 27/24; B01J 21/18; B01J 27/186; B01J 35/026; B01J 35/0013; B82Y 30/00; B82Y 40/00; C01P 2004/64; C25B 1/55; C01C 1/02; Y02P 20/52; C07C 1/02; C07C 9/04; C07C 2601/16; C02F 1/325; C02F 1/70; C02F 1/32; C02F 2201/3222; C02F 2103/06; C02F 2103/007; C02F 2101/36; C02F 2305/10; C02F 2201/3227; C02F 2301/024

See application file for complete search history.

(56) References Cited

U.S. PATENT DOCUMENTS

| | | | |
|---|---|---|---|
| 4,853,040 | A | 8/1989 | Mazur et al. |
| 5,110,364 | A | 5/1992 | Mazur et al. |
| 5,998,691 | A | 12/1999 | Abel et al. |
| 6,121,506 | A | 9/2000 | Abel et al. |
| 7,005,795 | B2 | 2/2006 | Pickard et al. |
| 8,986,532 | B2 | 3/2015 | Hamers et al. |
| 10,052,606 | B2 | 8/2018 | Hamers et al. |
| 2013/0192977 | A1 | 8/2013 | Hamers et al. |
| 2013/0200303 | A1 | 8/2013 | Pancras et al. |
| 2017/0183246 | A1 | 6/2017 | Gu et al. |
| 2020/0155885 | A1 | 5/2020 | Strathmann et al. |

FOREIGN PATENT DOCUMENTS

| | | |
|---|---|---|
| JP | 2001-089887 A | 4/2001 |
| JP | 2005-285729 A | 10/2005 |
| WO | 2011-010109 A1 | 1/2011 |

OTHER PUBLICATIONS

Wang et al., "Photocatalytic degradation of perfluorooctanoic acid and perfluorooctane sulfonate in water: A critical review", Chemical Engineering Journal, 328 (2017), 927-942. (Year: 2017).*
Liang et al., "Nondiamond core/onion-like carbon shell materials with excellent visible light photocatalytic activity", Mater. Res. Express 6 (2019) 045609 (Year: 2019).*
Search Report and Written Opinion in PCT/US2020/062257 (dated Mar. 24, 2021).
Bandy et al., "Photocatalytic reduction of nitrogen to ammonia on diamond thin films grown on metallic substrates" Diamond & Related Materials 64 (2016) 34-41.
Boukahil et al., "Unoccupied surface state induced by ozone and ammonia on H-terminated diamond electrodes for photocatalytic ammonia synthesis" J. Vac. Sci. Technol. A 35(4), Jul./Aug. 2017.
Christianson et al., "Mechanism of N2 Reduction to NH3 by Aqueous Solvated Electrons" J. Phys. Chem. B 2014, 118, 195-203.

(Continued)

*Primary Examiner* — Xiuyu Tai
(74) *Attorney, Agent, or Firm* — US Naval Research Laboratory; Joseph T. Grunkemeyer

(57) ABSTRACT

Disclosed is a method of irradiating a composition having water and hydrogen-terminated nanodiamonds with light that generates water-solvated electrons from the nanodiamonds. The method can be used to degrade fluoroalkyl compounds such as perfluorooctane sulfonate.

6 Claims, 2 Drawing Sheets

(56) References Cited

OTHER PUBLICATIONS

Hamers et al., "Atmospheric-pressure photoelectron emission from H-terminated and amino-terminated diamond" Phys. Status Solidi A 213, No. 8, 2069-2074 (2016).
Hamers et al., "Photoemission from diamond films and substrates into water: dynamics of solvated electrons and implications for diamond photoelectrochemistry" Faraday Discuss., 2014, 172, 397.
Jang et al. "Nanodiamonds as photocatalysts for reduction of water and graphene oxide" Chem. Commun., 2012, 48, 696-698.
Plymale et al., "Negative Electron Affinity Diamond Surfaces for Photoelectrochemical Reduction of Perfluoroalkyl Substances", Abstracts of Papers of the American Chemical Society 254 (2017).
Zhang et al., "Photocatalytic reduction of $CO_2$ to CO by diamond nanoparticles" Diamond & Related Materials 78 (2017) 24-30.
Zhang et al., "Selective Photoelectrochemical Reduction of Aqueous $CO_2$ to CO by Solvated Electrons" Angew. Chem. Int. Ed. 2014, 53, 9746 -9750.
Zhu et al., "Amino-terminated diamond surfaces: Photoelectron emission and photocatalytic properties" Surface Science 650 (2016) 295-301.
Zhu et al., "Photo-illuminated diamond as a solid-state source of solvated electrons in water for nitrogen reduction" Nat. Mat. 12, 836-841 (2013).

* cited by examiner

NANODIAMOND REDUCTION PHOTOCHEMISTRY

This application claims the benefit of U.S. Provisional Application No. 62/940,611, filed on Nov. 26, 2019. The provisional application and all other publications and patent documents referred to throughout this nonprovisional application are incorporated herein by reference.

TECHNICAL FIELD

The present disclosure is generally related to degradation of fluoroalkyl compounds.

DESCRIPTION OF RELATED ART

The extraordinary stability of the C—F bond imparts many commercially useful properties to poly- and perfluoroalkyl substances (PFASs), including a high resistance to degradation via traditional oxidative/reductive processes. One prior method requires a temperature and pressure of at least 200° C. and 2 MPa to mineralize a PFAS (US Pat. Appl. Pub. No. 2020/0155885). As a consequence, PFAS is a persistent contaminant in the environment, especially in water. Environmental concerns over the accumulation of recalcitrant PFASs in ground and well waters presents a pressing need to develop new and effective remediation methods.

Excess electrons can be added to water, or other solutions. In polar solutions such as water, the excess electron quickly "solvates" and becomes a solvated electron. In water, a solvated electron is alternatively called a hydrated electron. Hydrated electrons ($e_{aq}^-$) can be photodetached from a variety of materials under UV-excitation and possess enough potential energy (E°~2.9 V) to reduce many of the more common PFASs (e.g. perfluorooctanoate, PFOA, $E_{peak,ox}°$=2.5 V; perfluorooctanesulfonate, PFOS, $E_{peak,ox}°$=3.2 V). As a result, $e_{aq}^-$ are quite effective at the degradation of a variety of PFASs including PFOA and PFOS; however, the mechanism of PFAS degradation is still not well understood.

One method uses solvated electrons in liquid ammonia. Disadvantages include that liquid ammonia is a hazardous chemical and is difficult to handle, and that the method is not compatible with decontamination of water.

UV-sulfite, UV-ferrocyanide, and other classical photochemistries are not compatible with drinking water. There is a limited lifetime of the solution due to side reactions, and the chemistry is complex as a function of pH.

Diamond materials (other than nanodiamond) have a larger bandgap and require deep UV radiation. Also, the photo-electron yield is low.

BRIEF SUMMARY

Disclosed herein is a method comprising: providing a composition comprising water and hydrogen-terminated nanodiamonds, and irradiating the composition with light having a wavelength that generates water-solvated electrons from the nanodiamonds.

Also disclosed herein is a composition comprising: water, hydrogen-terminated nanodiamonds, and water-solvated electrons.

BRIEF DESCRIPTION OF THE DRAWINGS

A more complete appreciation will be readily obtained by reference to the following Description of Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is the ability to enable highly reductive chemistry in water. The ability to chemically reduce highly stable contaminants in water is a difficult and unmet challenge that is present in the environment. The impact of nanodiamond photochemistry on the degradation of one of the more resilient in the class of PFASs, PFOS, is demonstrated.

Time-dependent spectroscopic methodologies, including nanosecond UV-Vis transient absorption spectroscopy, and prolonged photolysis were used to directly probe the mechanism of PFOS degradation by $e_{aq}^-$ under varying environmentally relevant conditions, such as pH. This work demonstrated that hydrogen terminated detonation nanodiamond (HDND) is a promising source of $e_{aq}^-$ for PFAS degradation.

The method may provide:
Highly reductive chemistry in water
Potential to remove difficult contaminants such as PFAS from drinking water
Potential to remediate chem-bio contamination
Does not require photon energies >5.5 eV (UVC) as does macroscopic diamond
Could be "dusted" onto wet surfaces to decontaminate under UV
Could be implemented as a packed bed flowthru photochemical reactor
Pure carbon "photocatalyst" that is not caustic.
Safer alternative to liquid ammonia solvated electron technology
Effective in water over a broader pH range than UV-Sulfite solvated electron photochemistry, namely as low as pH 5

The method uses a composition comprising: water and hydrogen-terminated nanodiamonds. The water may already contain, or be suspected of containing, one or more fluoroalkyl compounds. Alternatively, the composition may be added to a possibly contaminated material or surface. The nanodiamonds have an average size of less than 100 or 10 nm in their greatest dimension.

Figure 1:
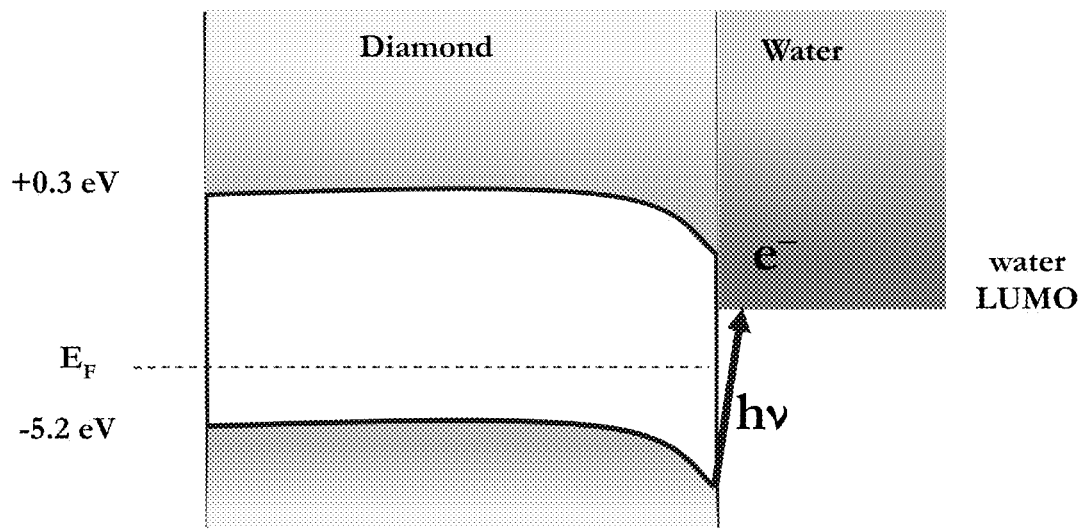
FIG. 1 illustrates the bandgap of nanodiamonds and photodetachment of electrons.

Next, the composition is irradiated with light having a wavelength that generates water-solvated electrons from the nanodiamonds. The wavelength may be for example, 225-295 nm or 254 nm. FIG. 1 illustrates that light may be of lower energy than the bulk diamond bandgap of 5.47 eV. This produces a composition comprising water, the nanodiamonds, and water-solvated electrons. The solvated electrons may react with and degrade any fluoroalkyl compounds that are present. Example fluoroalkyl compounds include, but are not limited to, perfluoroalkyl surfactants, perfluoroalkane sulfonates, perfluoroalkyl acids, perfluorooctane sulfonate, and perfluorooctyl acid.

Figure 2:
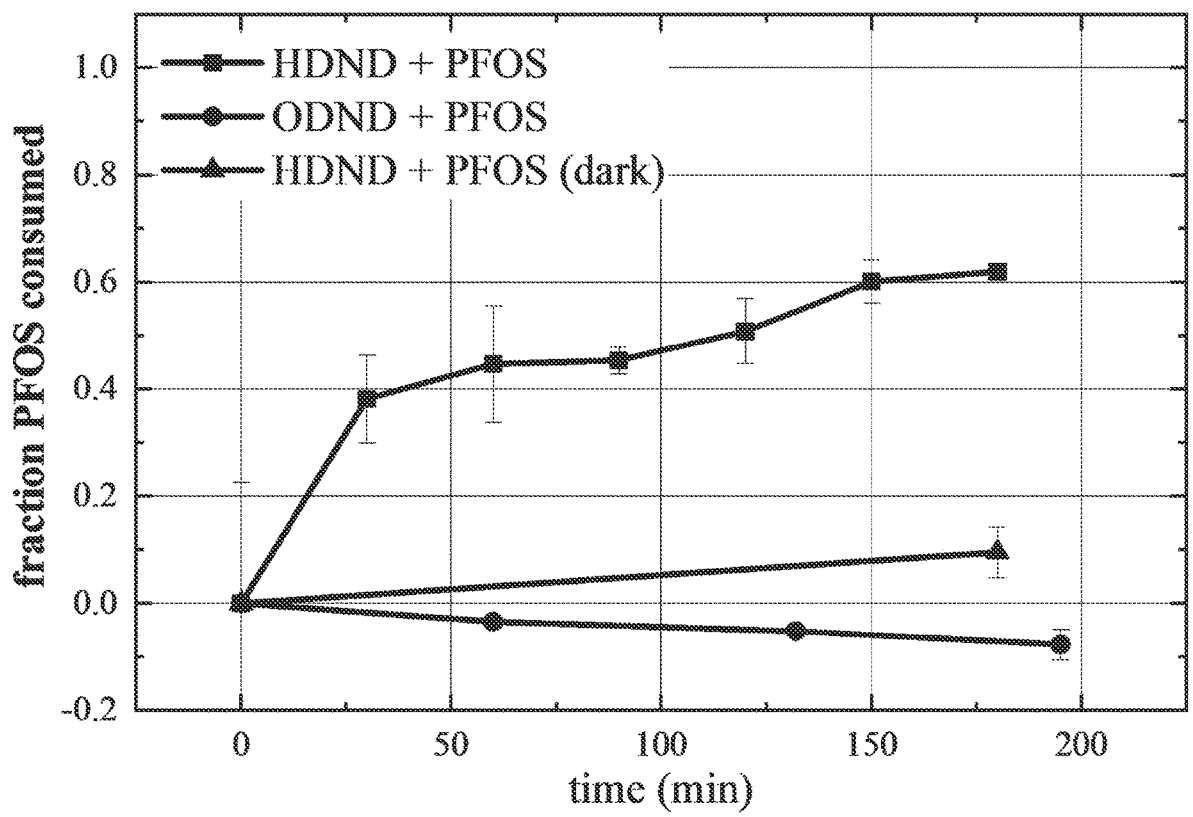
FIG. 2 shows the rate of degradation of PFOS from irradiation in the presence of hydrogen terminated detonation nanodiamond (HDND) and oxygen terminated detonation nanodiamond (ODND) and without irradiation.

The amount of the fluoroalkyl compound in the composition may be monitored. While monitoring, the irradiation of the composition may be continued until the amount of the fluoroalkyl compound in the composition has been reduced to a target amount. FIG. 2 shows sample data confirming the degradation of PFOS using HDND and 254 nm light. ODND with light and HDND without light did not cause degradation.

The following examples are given to illustrate specific applications. These specific examples are not intended to limit the scope of the disclosure in this application.

Preparation of hydrogenated detonation nanodiamond (HDND)—One gram of purified nanodiamond powder (~6 nm particle size) was placed in a quartz boat and inserted into a horizontal tube furnace. With the constant hydrogen flow of 29.0 sccm and hydrogen pressure of 280 Torr the temperature was raised in steps from ambient to 450° C. during the following 15 days. At the end of 16th day, the treated powder was cooled in a hydrogen atmosphere to 50° C., transferred to a warm glass jar, and placed in a nitrogen-purged box for storage until use.

Preparation of oxidized detonation nanodiamond (ODND)—One half gram of purified nanodiamond powder (~6 nm particle size) was placed in quartz boat and inserted into a horizontal tube furnace. The tube was left open to the room atmosphere and temperature was gradually increased from 25° C. to 445° C. over seven hours. At the end of this time, the powder was cooled to 100° C., transferred to a warm glass jar, and stored in the nitrogen-purged box for storage until use.

Probing decomposition of PFOS—Experiments probing the decomposition of PFOS resulting from prolonged irradiation of surface treated detonation nanodiamond were carried out in a Rayonet RPR-100 photochemical reactor equipped with 16 UV lamps (253.7 nm, 35 W max. output, RPR-2537A). The sample solutions were comprised of 100 mg HDND or ODND suspended in 100 mL ultra-pure water (nanopure filtration system, 18 MΩ) containing ~3 µM PFOS. The experiments were carried out under anaerobic conditions by continually purging the solutions with $N_2$. Aliquots of the UV-irradiated solutions were collected periodically throughout the course of the experiment to monitor the temporal progression of the PFOS decomposition. Degradation of PFOS was quantified by LC-MS using a Varian 500-MS ion trap mass spectrometer working in tandem with Varian 212-LC chromatography pumps.

Transient absorption spectroscopy—Transients formed upon UV-light excitation were probed by transient absorption spectroscopy. Details of the transient absorption setup are in Maza et al., Nanosecond transient absorption studies of the pH-dependent hydrated electron quenching by $HSO_3^-$. *Photochemical & Photobiological Sciences* 2019, 18(6), 1526-1532. Sample solutions were prepared by suspending ~10 mg HDND in 20 mL deionized water and filtering through 0.1 µm syringe filter twice to remove larger aggregates and minimize effects due to scattering. Solutions were excited using the 5 ns pulse from a Continuum Minilite II Nd:YAG laser tuned to 266 nm (~1 mJ/pulse) and probed using either a 790 nm continuous wave (cw) diode laser (Thorlabs model CPS780S) or a 200 W Xe arc lamp (Newport). The pump and probe were directed into the sample collinearly and the change in intensity of the probe was monitored with a Hamamatsu R375 photomultiplier tube (9 ns rise time, 70 ns transit time); the signals were digitized on a 200 MHz Tektronix TDS 420A oscilloscope with a 100 MS s$^{-1}$ sampling rate.

Using nanosecond transient absorption it was found that hydrated electrons result by photodetachment from hydrogen-terminated (negative electron affinity) detonation nanodiamond (HDND) suspensions in water upon sub-bandgap (266 nm) irradiation. Hydrated electron photogeneration from oxygen-terminated (positive electron affinity) detonation nanodiamond (ODND), on the other hand, is not observed. The transient absorption data suggest the presence of an interaction between PFOS and HDND and, more so, an interaction between PFOS and the hydrated electrons evidenced by a shorter average lifetime of the hydrated electron in the presence of PFOS. Finally, it was found that prolonged sub-bandgap (254 nm) irradiation of aqueous HDND in the presence of PFOS leads to full decomposition of PFOS by reductive fragmentation, consistent with hydrated electron reductive chemistry. Specifically, 254 nm photolysis of a solution containing 100 mg HDND and 3 µM PFOS ($C_8F_{17}SO_3$) results in ~30% degradation of PFOS within 30 minutes. Nearly complete loss of PFOS is observed within 4 hours of photolysis. The loss of the PFOS LC-MS signal is accompanied by the appearance and growth of product signals corresponding to formation of degradative products including $C_8F_{16}HSO_3$ (481 m/z), $C_5F_{10}HSO_3$ (331 m/z), and $C_4F_8HSO_3$ (281 m/z) within the first hour of photolysis. After ~90 minutes these photoproduct signals monotonically decrease consistent with further degradation. The identity of lower molecular mass (m/z<250) degradative products, however, could not be resolved due to instrument detection limitations.

Materials characterization—Nanodiamond surface chemistry was monitored with X-ray photoelectron spectroscopy (XPS). XPS data were acquired using a K-Alpha X-ray Photoelectron Spectrometer (ThermoFisher Scientific). XPS confirmed that sorption onto nanodiamond surfaces is not responsible for the observed depletion of PFOS from solution with UV exposure.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   providing a composition comprising:
      water; and
      hydrogen-terminated nanodiamonds;
         wherein the nanodiamonds have an average size of less than 10 nm; and
   irradiating the composition with light having a wavelength that generates water-solvated electrons from the nanodiamonds.

2. The method of claim 1, wherein the wavelength is 225-295 nm.

3. The method of claim 1, wherein the composition is suspected of containing a fluoroalkyl compound.

4. The method of claim 3, wherein the fluoroalkyl compound is a perfluoroalkyl surfactant, a perfluoroalkane sulfonate, a perfluoroalkyl acid, perfluorooctane sulfonate, or perfluorooctyl acid.

5. The method of claim 3, further comprising:
   monitoring the amount of the fluoroalkyl compound in the composition.

6. The method of claim 5, further comprising:

continuing the irradiation of the composition until the amount of the fluoroalkyl compound in the composition has been reduced to a target amount.

* * * * *